United States Patent [19]

Pevzner et al.

[11] 3,807,034
[45] Apr. 30, 1974

[54] METHOD OF TRUING UP HEAVY WORKPIECES ON THE TABLE OF A METAL-CUTTING MACHINE AND SUCH TABLE FOR CARRYING SAID METHOD INTO EFFECT

[76] Inventors: Semen Albertovich Pevzner, ul. Lenina, 24, kv. 16; Viktor Evseevich Koire, ul. Sotsialisticheskaya, 46, kv. 21, both of Kramatorsk, U.S.S.R.

[22] Filed: July 6, 1972

[21] Appl. No.: 269,408

[52] U.S. Cl. ................. 29/559, 90/58 R, 90/58 B, 269/309, 248/188.4, 51/240 R, 108/7
[51] Int. Cl. ............................................. B23q 1/04
[58] Field of Search .......... 90/58 R, 58 B, DIG. 15; 269/311–314, 309; 51/240 R, 27; 108/1, 4, 7; 29/559; 248/188.2, 188.4, 394, 395, 396, 398

[56] References Cited
UNITED STATES PATENTS
3,008,381  11/1961  Jones ................................ 90/58 X
3,592,102  7/1971  Berthiez ............................. 90/58 X
2,774,642  12/1956  Waller ................................. 108/7

FOREIGN PATENTS OR APPLICATIONS
743,891  10/1935  France ................................... 90/58

Primary Examiner—Andrew R. Juhasz
Assistant Examiner—Z. R. Bilinsky
Attorney, Agent, or Firm—Eric H. Waters

[57] ABSTRACT

The table together with the workpiece is imparted vertical motion in such a manner that its bearing points lying at the vertices of an imaginary parallelogram, move equal distances only in pairs constituted by the adjacent bearing points. To this end the bed of the table has four bearing members located at the vertices of an imaginary parallelogram and adapted for vertically changing the position of any pair of the adjacent bearing members with respect to the bed, with the result that the workpiece together with the table is set spatially true with respect to the machine operative unit.

4 Claims, 3 Drawing Figures

PATENTED APR 30 1974

METHOD OF TRUING UP HEAVY WORKPIECES ON THE TABLE OF A METAL-CUTTING MACHINE AND SUCH TABLE FOR CARRYING SAID METHOD INTO EFFECT

This invention relates generally to the machining of workpieces on metal-cutting machines and more specifically to a method of truing up heavy workpieces on the table of a machine-tool and to such table for carrying said method into effect.

The present invention can find most utility when employed for truing up heavy workpieces weighing over 50 tons on the tables of heavy horizontal boring-and-turning mills and shaping machines.

It is known to use a common method for truing up heavy workpieces on the table of a metal-cutting machine tool, involving the traveling of the table swivel portion in the horizontal plane.

In this case the workpiece is positioned on the table of a machine that incorporates the bed with straight ways, whereon the carriage is mounted which carries the table swivel portion.

To attain the required machining accuracy, the workpiece must be set true with respect to the machine operative unit so that the workpiece locating surfaces are parallel or perpendicular to the direction of travel of machine operative unit in the course of machining.

In said known truing method the workpiece is traversed in the horizontal plane by virtue of rotation of the table swivel portion.

For truing up the workpiece in the vertical plane, various manual techniques are employed, such as gibbing or changing the thickness of shims fitted in between workpiece bearing surfaces and the surface of the table swivel portion. Carrying out the aforesaid hand jobs takes much physical effort on the part of the operator, whereas the attainable truing accuracy of the workpiece depends upon the operator's personal skill and experience and therefore in many cases proves to be unsatisfactory. Moreover, such procedures lead to a prolonged standstill of the crane equipment involved, this in turn resulting in much time losses of the adjacent machine tools that also need to be loaded with the use of a crane.

We have established that, if prior to placing heavy workpieces (weighing 50–10 tons) on the table, the latter has been trued up with respect to the machine operative unit, the table becomes spatially reoriented due to strains arising under such a heavy load. This necessitates truing up of the workpiece even in cases where the latter has accurately machined locating (datum) surfaces. Besides, when machining several workpiece surfaces involving the variation of the angular position of the table swivel portion, there arise errors of the mutual position of said surfaces due to a disturbed variation of the table position with respect to the machine operative unit that has been trued up before placing the workpiece and, consequently, due to errors of the mutual position of the abovesaid machine parts. We have also established the values of said errors to be variable if the workpiece center of gravity does not lie on the axis of rotation of the table swivel portion.

It is a principal object of the present invention to provide such a method of truing up heavy workpieces on the table of a machine tool and such a table of metal-cutting machines for carrying said method into effect that is capable of attaining high-accuracy spatial arrangement of the workpiece being machined along with the table with respect to the machine operative unit.

This and other objects are accomplished by to the provision of such a method of truing up heavy workpieces on the table of a metal-cutting machine with respect to the operative unit thereof, involving horizontal traver-sing of the table swivel portion, wherein according to the invention the table along with the workpiece being machined is imparted a vertical motion in such a manner that the table bearing points which lie at the vertices of an imaginary parallelogram, move over equal distances only in pairs composed of the two adjacent bearing points.

It is expedient for carrying said method into effect to employ a table of a metal-cutting machine, comprising a bed with straight ways for traversing of the carriage carrying the table swivel portion which, according to the invention provided its bed with four bearing members located at the vertices of an imaginary parallelogram in such a manner that the position of any pair of the adjacent bearing members with respect to the table bed may be changed in the vertical plane, with the result that the workpiece together with the table is set spatially true with the machine operative unit.

It is preferred that each bearing member of the table bed be made essentially as a screw which makes up a screw pair with the nut provided in the bed, said pair being mechanically associated with the drive to impart vertical motion to the screw.

It is also preferred that provision be made in the bed for a hydraulic cylinder located nearby each of the bearing members thereof, the rod of said cylinder serving as a support to relieve the bearing member when the latter performs vertical motion with respect to the bed.

The herein-disclosed method and the table for carrying said method into effect, according to the present invention are capable of ensuring high-accuracy spatial arrangement of the workpiece together with the table with respect to the machine operative unit.

In what follows the invention will be made evident by disclosure of a specific embodiment thereof with due reference to the accompanying drawings, wherein.

Figure 1:
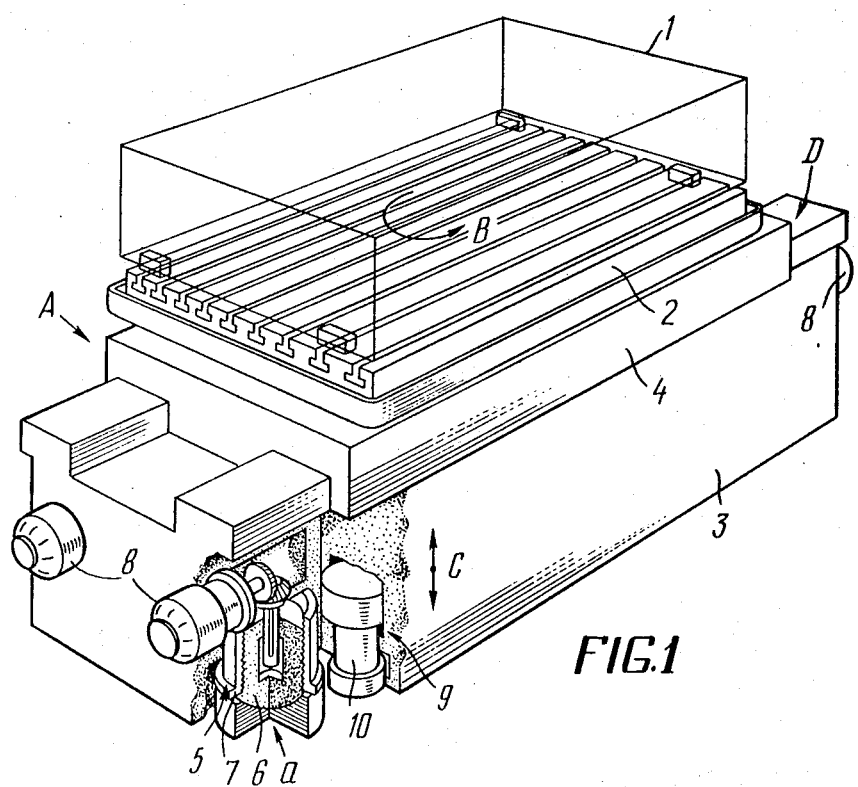
FIG. 1 is a perspective, fragmentarily cutaway view of the table of a metal-cutting machine to carry into effect the method of truing up heavy workpieces, according to the invention, the workpieces being shown in outline.
Figure 2:
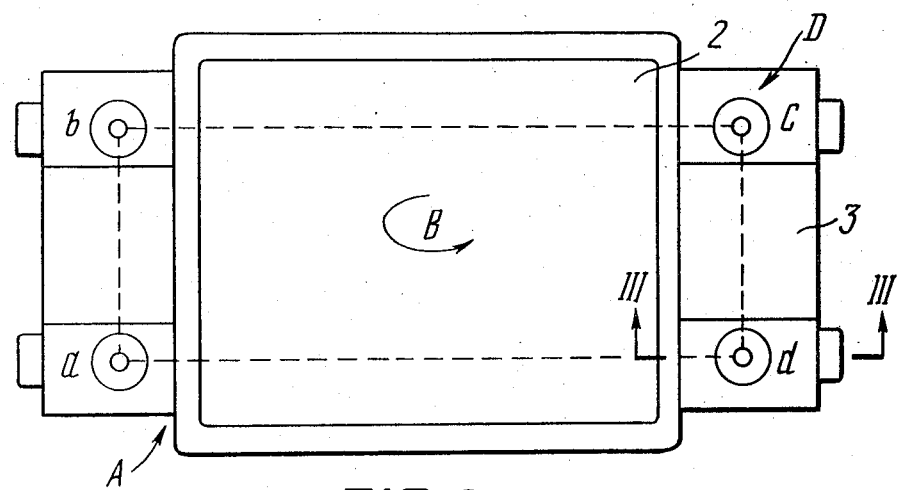
FIG. 2 is a schematic plan view of the table of the metal-cutting machine wherein, according to the invention its bearing points lie at the vertices of rectangle abcd.

The herein-proposed method of truing up heavy workpieces 1 (FIG.1) on a table A of a metal-cutting machine makes provision for a swivel portion 2 of the table A to travel in the horizontal plane in the direction of arrow B. According to the invention the table A together with the workpiece 1 is imparted vertical motion in the direction of arrow C in such a manner that the table bearing points $a$, $b$, $c$ and $d$ (FIG. 2) which lie at the vertices of an imaginary parallelogram, can move equal distances only in pairs composed of the adjacent points.

Such pairs may be composed of the points $ab$, $bc$, $cd$, or $ad$.

We have found that when the table bearing points perform vertical motion over equal distances in pairs, the bearing reactions (or counterpressures) developed at all the bearings points $a$, $b$, $c$ and $d$ under the weight of the table A carrying the workpiece 1, remain constant with the result that the table strain values remain unchanged accordingly. Evidently, correspondent to the preset lengths of travel of the bearing points are exactly the same lengths of travel of the table A with the workpiece 1 as referred to said points. Failure to observe such condition results in an inadequate variation of the values of bearing counterpressures effective at the bearing point $a$, $b$, $c$ and $d$ which, in turn, produces different table strain values at different bearing points and, consequently, to the preset length of travel of a given bearing point corresponds another length of travel of the table unequal thereto. This hampers the process of truing up heavy workpieces and renders it more time-consuming.

To carry into effect the method of truing up heavy workpieces, according to the invention provision is made in the table A of a bed 3 (FIGS. 1 and 2) provided with straight ways D which mount a carriage 4 that carries the swivel portion 2 of the table A.

The carriage 4 is driven along the bed ways D and the swivel portion 2 of the table A is rotated by respective conventional drives which are not disclosed in detail in the present description so as not to obscure the essence of the invention.

According to the invention, the bed 3 has four bearing members located at the vertices of an imaginary parallelogram (in the herein-considered specific embodiment said bearing members are located at the vertices of a rectangle) and adapted for varying the position of any of the adjacent bearing members in the vertical plane with respect to the bed, with the result that the workpiece together with the table is set spatially true with respect to the machine operative unit.

Figure 3:
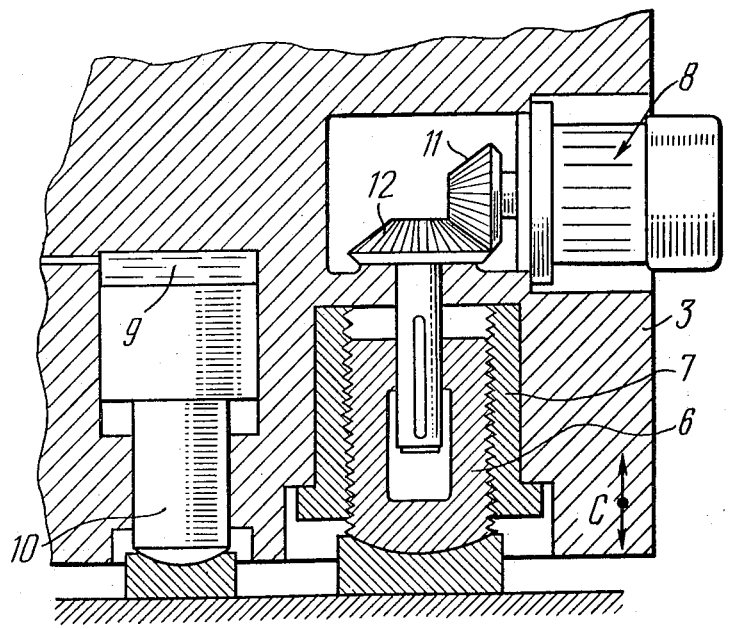
FIG. 3 is an enlarged-scale sectional view taken along the line III—III in FIG. 2.

In the herein-considered exemplary embodiment, each bearing member 5 of the bed 3, according to the invention essentially comprises a screw 6 (FIGS. 1 and 3) which together with a nut 7 provided in the bed 3, makes up a screw pair mechanically associated with a drive 8 to impart to the screw 6 vertical motion with respect to the nut 7 in the direction of the arrow C.

Conceptually, any remote-controlled electric motor is applicable for use in the drive 8; however, our experience has shown a power-type synchro-torque motor to be the most suitable for the purpose. Additionally, according to the invention provision is made in the bed 3 near each of the bearing members 5, for a hydraulic cylinder 9 with a connecting rod 10 which serves as a support to relieve the bearing member 5 when the latter performs vertical motion with respect to the bed 3 in the direction of the arrow C.

The drives 8 of all the bearing members, viz., the screws 6 are interconnected with the control system such that they are brought into operation pairwise, the pairs being constituted by the drives located at the points $ab$, $bc$, $cd$, or $ad$, as well as causing each pair of the bearing members (screws 6) at all times to travel equal distances and in the same direction. At the same time, provision is made for feeding power fluid to all the hydraulic cylinders 9 or only to those located near the drives 8 to be engaged, at a pressure high enough to overcome the bearing counter-pressure and to lift the table. Upon disengaging the drives 8 power fluid is let out from the hydraulic cylinders 9.

Said control system may be made according to any of the heretofore known layouts suitable for the purpose.

Truing-up of the heavy workpiece 1 with respect to the operative unit of a metal-cutting machine is carried out as follows.

The workpiece 1 is placed on the swivel portion 2 of the table A of the machine, whereupon its actual position with respect to the machine operative unit is determined by one of the heretofore practicable methods and, consequently, the lengths of setup movements that are to be performed in order that the workpiece would assume the true position with respect to the machine operative unit.

Then, the workpiece 1 is rotated together with the table swivel portion 2 so as to be set to the required position with respect to the machine operative unit in the horizontal plane.

To attain the required workpiece position in the vertical plane, according to the invention first one of the pairs of the adjacent table bearing points, say, ab is traversed vertically over the required distance with respect to the bed nuts 7 by means of the drives 8 mechanically associated via a pair of bevel gears 11, 12 with the respective screw 6, viz., the bearing member of the bed 3, whereupon the other pair, say, bc is likewise made to travel. If the lengths of travel of the pairs are equal to the required ones and the direction of motion has been the same, when the aforesaid movements of the bed bearing members have been completed, the workpiece 1 assumes the required position in space with respect to the machine operative member.

If an angular turn of the table swivel portion 2 carrying the workpiece disturbs the true vertical orientation thereof with respect to the machine operative unit due to table additional strains, this will be revealed when checking the workpiece position, and a short time will be required to effect additional motion of the table with the workpiece following the procedure described above, to correct the position thereof.

It is worth noting that a basic possibility is provided to effect traversing of the bearing members (screws 6) loaded with the weight of the table and workpiece, by means of the drives 8; however, this involves high-power drives, and the device would become bulky and possess but low sentitivity to small displacements.

Therefore, according to the invention the bearing members 5 are relieved in the following way. Simultaneously with the engagement of the drives 8, power fluid is fed into the interior chambers of the hydraulic cylinders 9 at a pressure high enough to lift the table A carrying the workpiece 1. This produces forces on the connecting rods 10 capable of lifting the table together with the workpiece placed thereon, and the bearing members become relieved of the weight of the table carrying the workpiece.

Due to the fact that in such position the screw 6 is loaded only with its own weight, a low-power motor is required to overcome the forces resisting its motion. Thus, a possibility is afforded of using as the drives 8 lightweight low-power motors (such as synchro-torque motors) which are capable of effecting small displacements with high accuracy while making the drive compact.

Due to the fact that the bearing points of the table that carry the workpiece, travel over equal distances in pairs which are constituted by the adjacent bearing points, the values of the bearing counterpressures remain constant which precludes additional table strains. As a result, to the preset length of travel of the bearing points corresponds the same length of the table lifting or lowering movement.

Due to the fact that, according to the invention truing up of the workpiece with respect to the machine operative units is carried out together with the table, any manual labor in the truing-up prosedure is dispensed with and the necessity of using crane equipment for truing-up procedure is eliminated.

Thus, the proposed method of truing up heavy workpieces on the table of metal-cutting machine and such a table for carrying said method into effect ensure high-accuracy truing of the workpiece with respect to the machine operative unit and, cosequently, its machining accuracy and makes it possible to do away with any manual labor in the truing-up procedure which, in turn, is conducive to high production efficiency.

What is claimed is:

1. A method of truing up heavy workpieces on the table of a metal-cutting machine with respect to an operative machining unit thereof, said method comprising forming said table with a bed, a carriage and a swivel portion capable of receiving the workpiece, supporting the carriage for back and forth movement on said bed in a horizontal plane, mounting the swivel portion on said table such that the swivel portion is capable of turning in a plane parallel to the plane of the table, supporting said bed at four locations forming the vertices of an imaginary parallelogram, representing support points for the bed and adjusting the position of the workpiece to be true with respect to the machining unit by tilting the table and the workpiece thereon such that the table is moved vertically only at pairs of adjacent vertices over equal distances in the same direction about an axis defined by the other pair of vertices.

2. A table of a metal-cutting machine for truing up heavy workpieces with respect to a machine operative unit, said table comprising: a bed with straight ways; a carriage mounted on said bed ways; a swivel portion mounted on said carriage; four bearing members carrying said bed and located at the vertices of an imaginary parallelogram representing support points for the bed, said bearing members including means for vertically adjusting the position of said bearing members with respect to the bed only at adjacent paired vertices over equal distances, with the result that said workpiece together with the table is tilted about an axis defined by the other pair of vertices to be set spatially true with respect to the machine operative unit.

3. A table as claimed in claim 2 wherein the adjusting means of each bearing member of the bed comprises a support screw, a nut in said bed receiving said screw, and drive means coupled to the assembly of the nut and screw to impart vertical motion to said screw.

4. A table as claimed in claim 2 comprising a hydraulic cylinder located adjacent each of said bearing members and including a connecting rod serving as a support to relieve said bearing member when the latter effects vertical adjustment.

* * * * *